United States Patent [19]

Nunes

[11] Patent Number: 4,879,845

[45] Date of Patent: Nov. 14, 1989

[54] MACHINE TOOL

[76] Inventor: Francisco M. D. S. Nunes, P.O. Box G, Salamhof, 7532 Bellville, South Africa, 7532

[21] Appl. No.: 328,809

[22] Filed: Mar. 27, 1989

Related U.S. Application Data

[63] Continuation of Ser. No. 120,146, Nov. 13, 1987, abandoned.

[30] Foreign Application Priority Data

Dec. 1, 1986 [ZA] South Africa .................. 86/9049

[51] Int. Cl.$^4$ .................................................. B24B 7/00
[52] U.S. Cl. ................................. 51/98.5; 51/240 R; 51/100 P
[58] Field of Search ............. 51/98.5, 96, 238 R, 51/238 T, 240 R, 219 R, 234, 100 P; 83/268, 467 R, 488, 471.3, 565; 409/79, 85, 86, 87; 269/309

[56] References Cited

U.S. PATENT DOCUMENTS 2,046,060  6/1936  Crowley .................................. 51/96
2,751,719  6/1956  Reichel .............................. 51/100 P
3,888,049  6/1975  MacSwean ............................ 51/54

Primary Examiner—James G. Smith
Assistant Examiner—Maurina Rachuba
Attorney, Agent, or Firm—Robert A. Green; Abraham Wilson

[57] ABSTRACT

A machine tool includes a stand having a tool mount so that a driven tool can be mounted on the stand and a work-table for supporting a work-table to be machined by the driven tool. A pair of articulated arms connect the work-piece to the stand and each articulated arm is connected at one end of the stand so as to be pivotal with respect to the stand about a first pivot axis, and is connected to the work-table so as to be pivotal with respect to the work-table about a second pivot axis. In addition, each articulated arm comprise at lease two arm segments, the (or each) pair of adjacent arm segment being interconnected so as to be pivotal with respect to one another about a further pivot axis, the first, the second, and the (or each) said further pivot axes being parallel to one another.

13 Claims, 5 Drawing Sheets

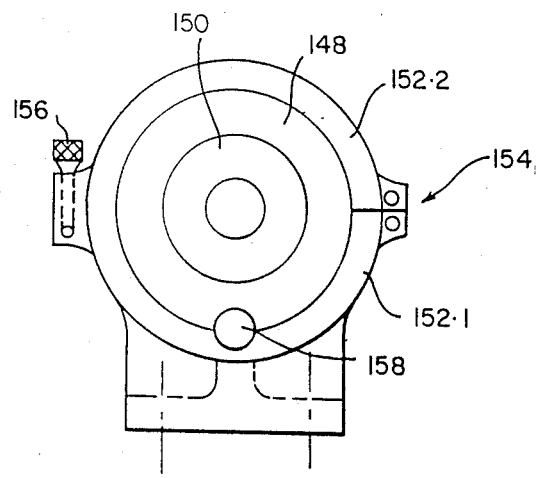
FIG. 9
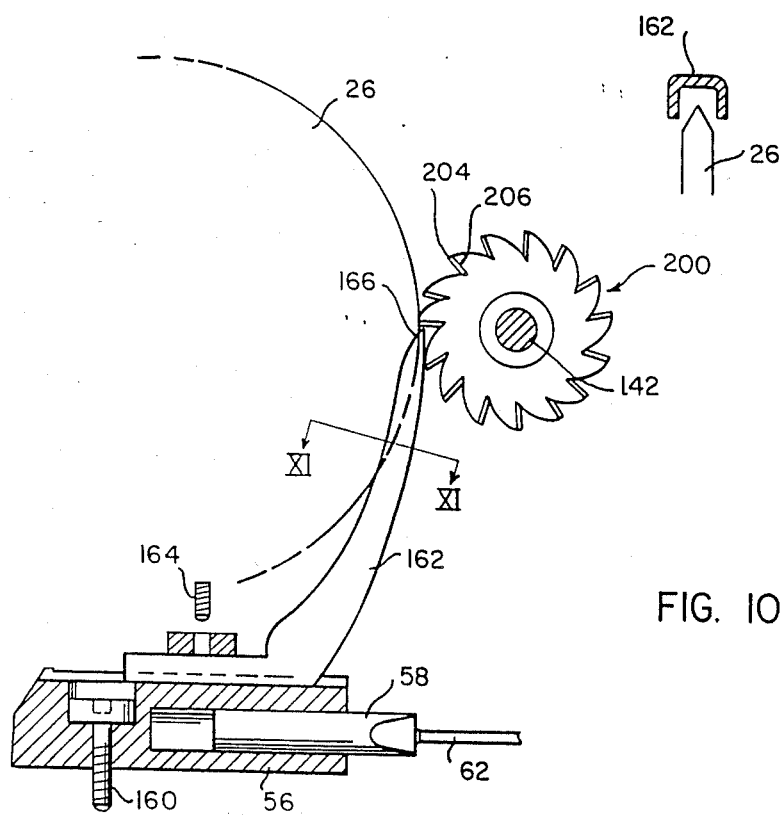
FIG. 11
FIG. 10

MACHINE TOOL

This is a continuation of co-pending application Ser. No. 07/120,146 filed on 11/13/87, now abandoned.

BACKGROUND OF THE INVENTION

This invention relates to a machine tool. More particularly, but not exclusively, the invention relates to a universal form cutter grinder, i.e. a machine tool which is capable of sharpening a wide range of different cutting tools.

At the present time there is no apparatus known for performing this function.

SUMMARY OF THE INVENTION

According to the invention there is provided a machine tool which comprises:

a stand having a tool mount whereby a driven tool can be mounted on the stand;

a work-table for supporting a work-piece to be machined by the driven tool; and first and second articulated arms connecting the work-table to the stand;

each articulated arm being at one end connected to the stand so as to be pivotal with respect to the stand about a first vertical pivot axis, and being at the other end connected to the work-table so as to be pivotal with respect to the work-table about a second vertical pivot axis;

each articulated arm comprising at least two arm segments, adjacent arm segments of each respective arm being interconnected so as to be pivotal with respect to one another about a further vertical pivot axis; and the pivotal connection of said first articulated arm to the stand being spaced horizontally from the pivotal connection of said second articulated arm to the stand, and the pivotal connection of said first articulated arm to the work-table being spaced horizontally from the pivotal connection of said second articulated arm to the work-table.

Further features of the invention will become apparent from the following description, with reference to the drawings, of an example of the invention.

BRIEF DESCRIPTION OF THE DRAWINGS

FIG. 9 is an end view of the arbor assembly;

FIG. 10 is a section of a follower/tool-rest mounting forming part of the machine tool, the drawing also showing part of the machine tool's grinding wheel and a circular cutter being sharpened; and FIG. 11 is a section on line XI—XI in FIG. 10.

DETAILED DESCRIPTION OF PREFERRED EMBODIMENT

Figure 1:
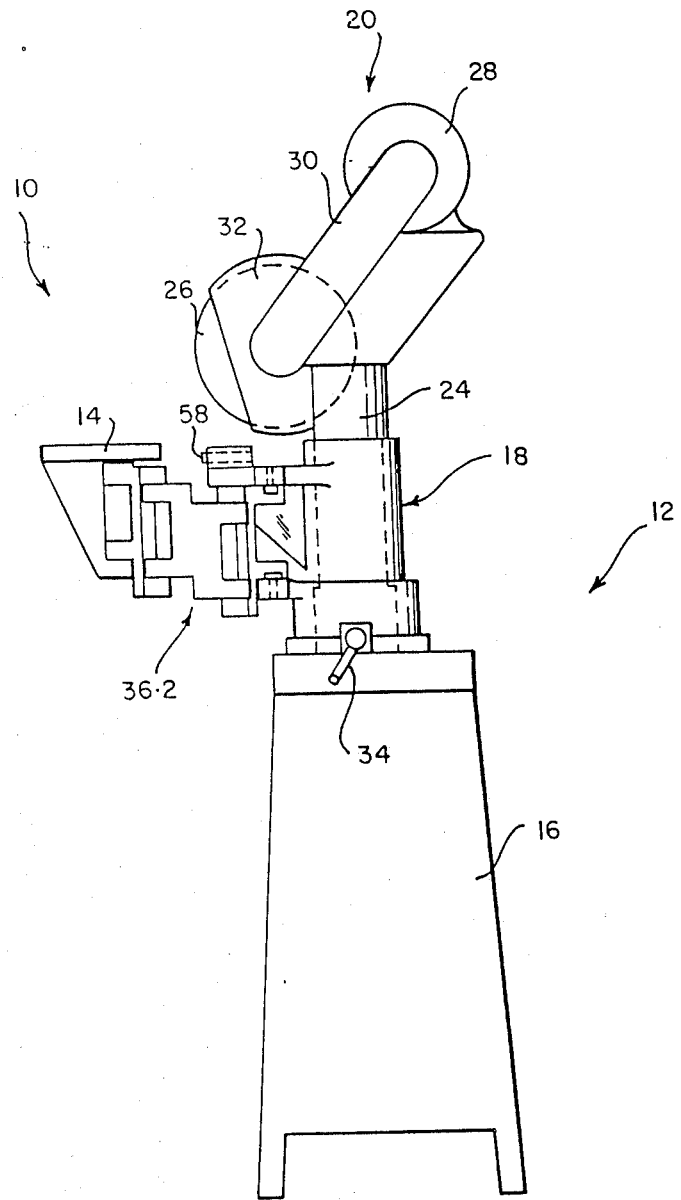
FIG. 1 is a side view of a machine tool in the form of a universal form cutter grinder in accordance with the invention.
Figure 2:
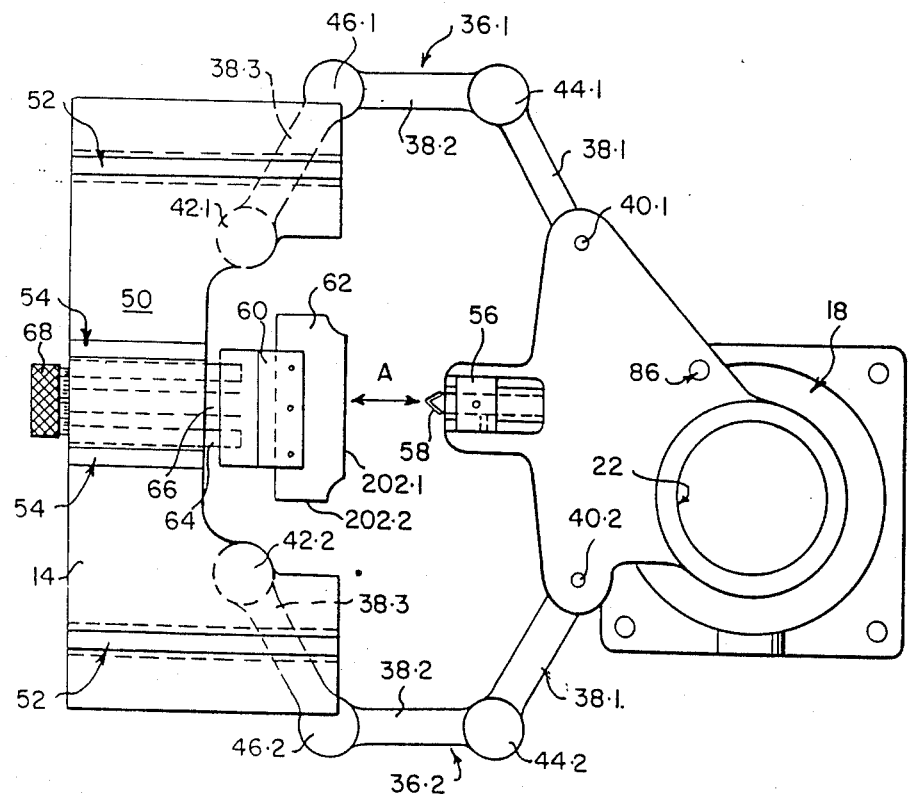
FIG. 2 is a plan view, drawn to a larger scale, of part of the cutter grinder.
Figure 3:
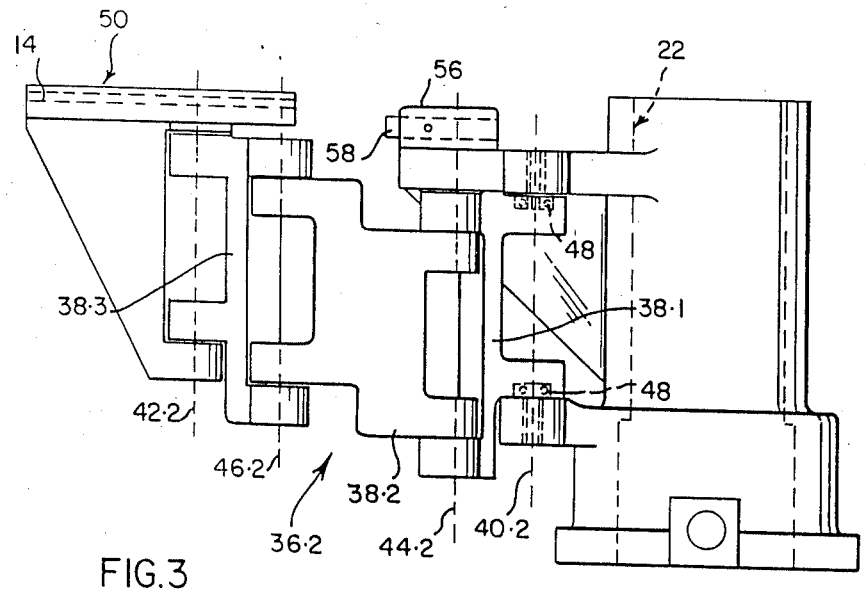
FIG. 3 is a side view of the parts shown in FIG. 2.

Referring first to FIGS. 1 to 3, reference numeral 10 generally indicates a cutter grinder which comprises a stand 12, and a work-table 14. The stand 12 comprises a pedestal 16 and a fixed member 18 which is mounted on the pedestal. The fixed member 18 is adapted to carry a tool assembly 20 by having a cylindrical guide way 22 therein for receiving a cylindrical post 24, the tool assembly 20 being secured to the upper end of the cylindrical post. The tool assembly 20 comprises a grinding wheel 26, and an electric motor 28 for driving the grinding wheel. The output shaft of the electric motor 28 is connected to the shaft of the grinding wheel 26 by means of a belt drive which is covered by a belt guard 30. The grinding wheel 26 is also partly covered by a protective guard 32. A crank 34 is provided to raise or lower the cylindrical post 24 with respect to the fixed member 18.

The work-table 14 is connected to the fixed member 18 by means of a pair of articulated arms 36.1 and 36.2. Each articulated arm 36.1, 36.2 consists of three arm segments, namely a first end segment 38.1, an intermediate segment 38.2, and a second end segment 38.3. The first end segment 38.1 of the arm 36.1 is connected to the fixed member 18 so as to be pivotal about a vertical pivot axis 40.1, whereas the first end segment 38.1 of the other arm 36.2 is connected to the fixed member 18 so as to be pivotal about a vertical pivot axis 40.2. Likewise, the second end segment 38.3 of the arm 36.1 is connected to the work-table 14 so as to be pivotal about a vertical pivot axis 42.1, whereas the end segment 38.3 of the arm 36.2 is connected to the work-table 14 so as to be pivotal about a vertical pivot axis 42.2. Furthermore, the first end segment 38.1 of the arm 36.1 is connected to the corresponding intermediate segment 38.2 so as to be pivotal about a vertical axis 44.1, and the second end segment 38.3 of the arm 36.1 is connected to the corresponding intermediate segment 38.2 so as to be pivotal about a vertical pivot axis 46.2. Likewise, the end segments 38.1 and 38.3 of the arm 36.2 are connected to the corresponding intermediate segment 38.2 so as to be pivotal about vertical pivot axes 44.2 and 46.2 respectively. The pivot axes 40.1, 40.2, 42.1, 42.2, 44.1, 44.2, 46.1, and 46.2 are all vertical and thus parallel to one another. In respect of each of the pivot axes, the pivotal mounting is by way of a pair of vertically spaced ball bearings, only two of which are shown (dotted) in FIG. 3 at 48, each pair of bearings being able to withstand an axial load. This particular connection of the work-table 14 to the fixed member 18 will constrain the work-table 14 to movement in a horizontal plane, but will permit movement of the work-table to any point (within limits determined by the length of the arms 36.1, 36.2 when fully extended) in that plane and will also permit limited rotation of the table about a vertical axis.

The work-table 14 has a horizontal mounting surface 50 in which there are a pair of T-grooves 52 and a pair of locating grooves 54.

The fixed member 18 is provided with a follower/tool-rest mounting 56 in which a follower 58 is secured (see also FIG. 10), and the work-table 14 is provided with a holder 60 in which a template 62 can be clamped so as to be at the same height as the follower 58. The holder 60 is mounted on cross slides 64 below the table 14, and is provided with a feed screw 66 having a knurled knob 68 so as to permit adjustment of the template 62 in the direction of arrows A. The follower 58 will be adjusted so as to be vertically below the leading edge of the grinding wheel 26, as will be seen in FIGS. 1 and 10.

Co-operation of the follower 58 and the template 62 will limit the extent to which the work-table 14 can be displaced toward the fixed member 18, and thus towards the grinding wheel 26. The leading edge of the template 62 can be provided with any desired profile, so as to enable grinding of a tool to a corresponding profile.

Figure 4:
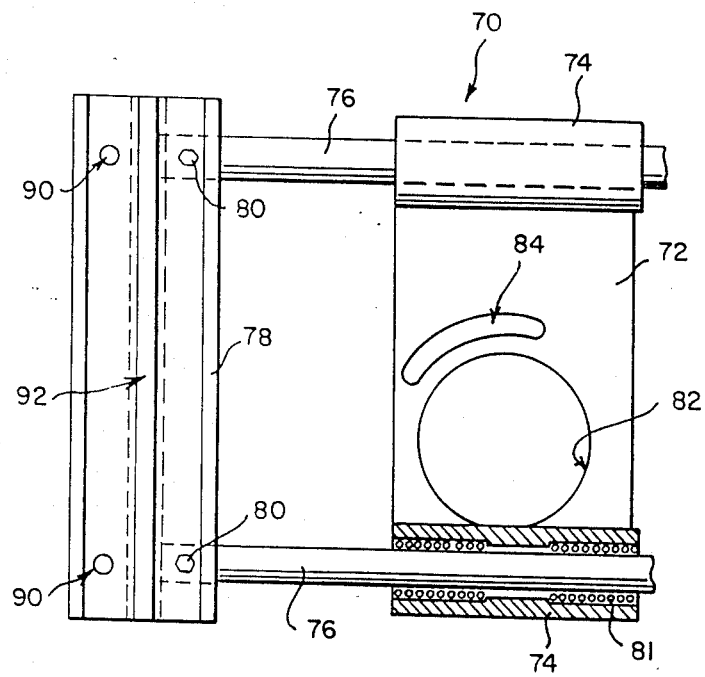
FIG. 4 is a plan view (partly in section) of a guide assembly for use with the cutter grinder.
Figure 5:
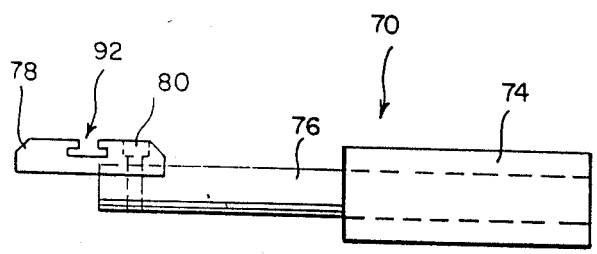
FIG. 5 is a side view of the guide assembly.

If it is desired to confine movement of the work-table 14 to a single linear direction, the guide assembly illustrated in FIGS. 4 and 5 may be secured in position. The guide assembly, which is generally indicated by reference numeral 70, comprises a plate 72 which is provided with a pair of spaced, parallel guide ways 74 (one of which is shown in longitudinal section), a pair of guide rods 76 each being displaceable along a respective one of the guide ways 74, and a cross member 78 supported by the free ends of the guide rods 76. The cross member 78 is secured to the guide rods 76 by means of screws 80. The guide ways 74 are provided with linear, recirculating ball bearings 81.

The plate 72 has a round opening 82 therein, and adjacent the round opening, an arcuate slot 84 which is concentric with the opening 82. The diamter of the opening 82 is fractionally bigger than the outer diameter of the upper end of the fixed member 18, so that the plate can fit snugly onto the member 18. The plate 72 is secured in position on the member 18 by means of a screw (not shown) which passes through the arcuate slot 84 and engages with a screw threaded hole 86 (see FIG. 2) in the fixed member 18. When the screw is loosened, the position of the guide assembly 70 about the member 18 can be adjusted.

The cross member 78 is secured to the work-table 14 by means of a pair of screws which pass through holes 90 in the member 78 and engage with the T-grooves 52. The cross member 78 is provided with a T-groove 92, whereby a tool to be sharpened can be mounted on the cross member 78, in a manner which will now be described with reference to FIGS. 6 and 7.

Figures 6, 7:
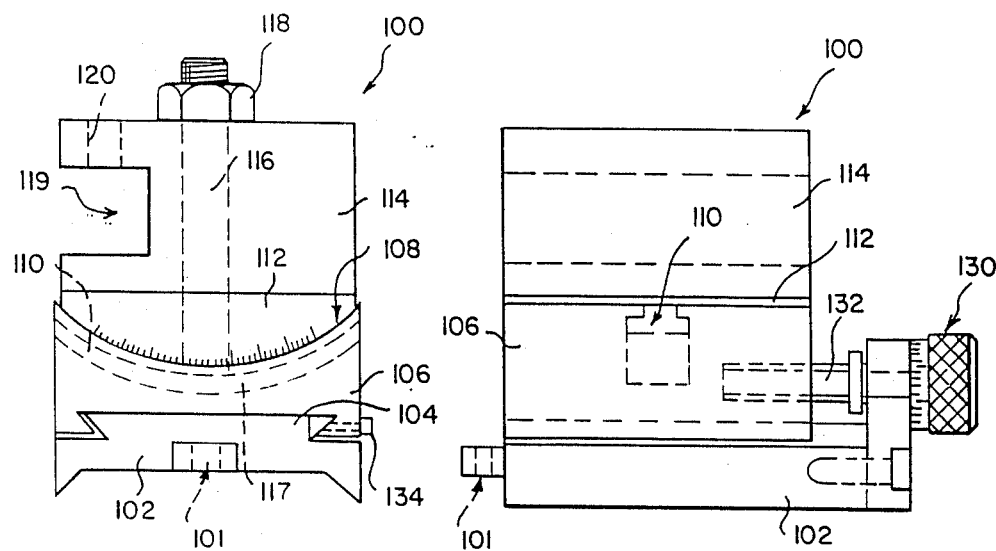
FIG. 6 is an end view of a swivel tool post for use with the cutter grinder and the guide assembly.
FIG. 7 is a side view of the swivel tool post.

In FIGS. 6 and 7, there is shown a swivel tool post 100 which is adapted to be mounted on the cross member 78 of FIGS. 4 and 5 by screws passing through bolt holes 101 and have heads engaging with the T-groove 92. The swivel tool post 100 comprises a base 102 which is provided with a slide way 104, and a slide member 106 which has formations to co-operate with the slide way 104 and an upwardly facing, concave surface 108 in which there is an arcuate T-groove 110. The swivel tool post further comprises a tilt member 112 which has a downwardly facing convex surface complementary to the concave surface of the slide member 106, and a tool block 114 on top of the tilt member 112. A screw 116 which has a head 117 displaceable along the T-groove 110 and which extends through bores in the tilt member 112 and the tool block 114 is provided to lock the parts 106, 112, and 114 together, this being done by tightening a nut 118 on the screw 116. If the nut 118 is loosened, the parts 112 and 114 can be displaced arcuately about the axis of curvature of the surface 108, and the part 114 can be rotated with respect to the part 112 about the axis of the bolt 116.

The tool block 114 has a slot 119 therein in which a lathe tool which is to be sharpened can be mounted. To secure the lathe tool in position, a locking screw (not shown) engaging with a threaded hole 120 in the tool block 114 is tightened.

A feed screw 130 which is held captive with respect to the base 102 and whose screw threaded spindle 132 engages with a screw threaded bore in the slide member 106 is provided to adjust the position of the slide member 106 along the base 102. A locking screw 134 is provided to lock the parts 102 and 106 together, after the part 106 has been adjusted to the desired position.

Figure 8:
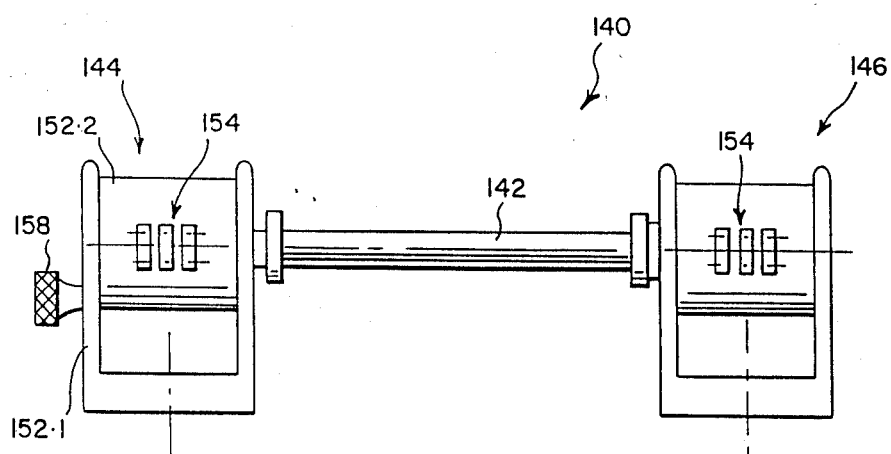
FIG. 8 is a side view of an arbor assembly for use with the cutter grinder.

Referring now to FIGS. 8 and 9, reference numeral 140 generally indicates an arbor assembly which comprises an arbor 142 and two arbor mounts 144 and 146, each for supporting one end of the arbor 142. Each end of the arbor 142 is supported in the respective arbor mount 144, 146 via a pair of bearings (not shown) between an outer casing 148 and an inner sleeve 150. The bearings are such that they can take radial as well as axial load and locate the outer casing 148 and the inner sleeve 150 with respect to one another axially. The inside of the inner sleeve 150 associated with the arbor mount 144 is slightly tapered, whereas that associated with the arbor mount 146 is cylindrical. The end of the arbor 142 located in the arbor mount 144 has a corresponding taper, so that the arbor 142 can be located axially with respect to the sleeve 150 associated with the arbor mount 144. The other end of the arbor 142 is slideable in the sleeve 150 associated with the arbor mount 146.

Each of the arbor mounts 144, 146 has a clamshell type of construction comprising two parts 152.1 and 152.2 which are connected together on one side by a hinge 154. A clamping screw 156 is provided on the other side, opposite the hinge 154, and this can be used to clamp the parts 152.1 and 152.2 tightly around the outer casing 148.

The arbor mount 144 is provided with a feed screw 158 which has a collar (not shown) engaging with a transverse slot in the respective outer casing 148. Thus, when the clamping screw 156 has been loosened, the axial position of the outer casing 148, and thus of the arbor 142, with respect to the arbor mount 144 can be adjusted.

The arbor mounts 144, 146, can be secured to the worktable 14 (see FIGS. 2 and 3) by means of screws which have heads engaging with the T-grooves 52.

Referring now to FIGS. 10 and 11, the follower/toolrest 56 can be secured to the fixed part 18 (see FIGS. 2 and 3) by means of a screw 160. In addition to the follower 58 which is secured to the mounting 56, a tool rest 162 is also secured to the mounting 56, this being effected by means of a grub screw 164. The tool rest 162 is channel-like in cross-section and partly embraces the leading edge of the grinding wheel 26. The tip 166 of the tool rest is at approximately the same level as the axis of rotation of the grinding wheel.

A few examples will now be given of the uses to which the cutter grinder 10 can be put. It should be appreciated that these examples are not exhaustive and that the cutter grinder can be used for many other purposes.

To sharpen a circular cutter 200 (see FIG. 10) the arbor assembly 140 is secured to the worktable 14, and the cutter 200 mounted on the arbor 142. A template 62 is used which has two perpendicular edges 202.1 and 202.2 (see FIG. 2). With the arbor 142 extending parallel to the axis of rotation of the grinding wheel 26, the table 14 is displaced towards the grinding wheel until the follower 58 abuts against the edge 202.1 of the template 62, and the feed screw 66 is adjusted until the grinding wheel starts grinding the axially extending cutting edges 204 of the cutting wheel. The entire cutting edge 204 can now be ground by moving the worktable 14 in a direction perpendicular to the direction of arrows A, with the follower 58 following the edge 202.1. To grind the radially extending cutting edges 206 of the cutter 200, the worktable 14 is pivoted about a vertical axis and displaced towards the grinding wheel 26 so that the follower 58 abuts against the edge 202.2 of the template 62. The worktable is now moved to and fro with the follower 58 following the edge 202.2 to sharpen the entire radially extending cutting edge 206. During the sharpening procedure, the cutter tooth which is being sharpened rests on the tip 166 of the tool rest 162 as shown in FIG. 10.

To sharpen an end-mill (not shown), the arbor 142 and the arbor mount 146 are removed, leaving only the arbor mount 144 in place on the worktable 14. A chuck (not shown) having a tapered spindle is now secured to the inner sleeve 150 associated with the arbor mount 144, and the end-mill secured in the chuck. The end-mill can now be sharpened in a manner similar to that described above with reference to FIG. 10. End-mills with straight or helical flutes can be sharpened in this manner.

To sharpen a lathe tool, the arbor mount 144 is also removed, and the guide assembly 70 secured in position to the worktable 14 as described above. Also, the swivel tool post 100 is secured to the cross member 78 and the lathe tool mounted in the sot 119 as described above. Movement of the cutting tool which is being sharpened is now guided by the guide assembly 70, the template 62 and the tool rest 162 not being used.

The inner mounting slots 54 can be used to mount a dressing tool for dressing the grinding wheel 26.

What is claimed is:

1. A machine tool comprising
   a stand having a tool mount whereby a driven tool can be mounted on the stand; and
   a work-table for supporting a work-piece to be machined by the driven tool;
   first and second articulated cantilever arms secured to and extending from said stand and supporting said work-table;
   each articulated arm being at one end connected to the stand so as to be pivotal with respect to the stand about a first vertical pivot axis, and being at the other end connected to the work-table so as to be pivotal with respect to the work-table about a second vertical pivot axis;
   each articulated arm comprising at least two arm segments, adjacent arm segments of each respective arm being interconnected so as to be pivotal with respect to one another about a further vertical pivot axis; and
   the pivotal connection of said first articulated arm to the stand being spaced horizontally from the pivotal connection of said second articulated arm to the stand, and the pivotal connection of said first articulated arm to the work-table being spaced horizontally from the pivotal connection of said second articualted arm to the work-table.

2. The tool defined in claim 1 wherein each arm consists of three arm segments.

3. The tool defined in claim 1 wherein the mounting of each of said articualted arms to said stand and to said work-table and the interconnection of adjacent arm segments to one another is by way of frictionless bearings.

4. A machine tool as defined in claim 1, wherein the driven tool is a grinding wheel mounted on the tool mount.

5. A machine tool as defined in claim 1 including a tool assembly including a cylindrical post and a driven tool; and wherein the tool mount includes an operative fixed member which has a cylindrical guide way therein, said post being a close sliding fit in said guide way.

6. A machine tool as defined in claim 5, wherein the driven tool is in the form of a grinding wheel.

7. A machine tool as defined in claim 1, which further comprises a template mounted with respect to the work-table, and a follower mounted with respect to the stand, the follower being co-operable with the template to guide movement of the work-table with respect to the stand.

8. A machine tool as defined in claim 1, wherein the work-table has an upper surface with T-grooves therein, for use in securing a work-piece to the work-table.

9. A machine tool as defined in claim 1, which further comprises a dismountable guide assembly, the guide assembly comprising a first component part which is dismountably mountable with respect to the work-table, a second component part which is dismountably mountable with respect to the stand, and guide means for linearly guiding the first component part with respect to the second component part.

10. A machine tool as defined in claim 9, wherein said guide means comprises a pair of spaced, parallel, horizontally extending rods associated with one of said component parts, and a pair of recirculating ball bearings associated with the other of said component parts, each rod being co-operable with a respective one of the recirculating ball bearings.

11. A machine tool as defined in claim 9, wherein the second component part of the guide assembly is pivotally adjustable with respect to the stand about an upright pivot axis.

12. A machine tool as defined in claim 9, which further comprises a swivel tool post which is dismountably mounted on said first component part, the swivel tool post comprising a tool block in which a tool to be sharpened can be clamped, and the tool block being adjustable with respect to the work-table about two mutually orthogonal adjustment axes.

13. A machine tool as defined in claim 9 which further comprises an arbor assembly, the arbor assembly comprising an arbor, and a pair of arbor mounts for supporting opposite ends of the arbor with respect to the first component part so as to axially locate the arbor with respect to the work-table.

* * * * *